United States Patent [19]
Hardesty et al.

[11] Patent Number: 5,116,106
[45] Date of Patent: May 26, 1992

[54] TRACTOR HUB WITH DETACHABLE WHEEL WEIGHTS

[75] Inventors: Terry D. Hardesty, Columbus; Wayne R. Hutchison, Mayville; Richard D. Teal, Horicon, all of Wis.; Robert J. Cleereman, Midland, Mich.

[73] Assignee: Deere & Company, Moline, Ill.

[21] Appl. No.: 715,176

[22] Filed: Jun. 14, 1991

[51] Int. Cl.⁵ .............................. B60B 15/28
[52] U.S. Cl. .................. 301/41 W; 301/5 B; 301/105 R
[58] Field of Search ........ 301/5 R, 5 B, 5 BA, 301/6 R, 6 WB, 105 R, 108 S, 108 R, 41 W, 41 R; 295/6; 280/755, 757, 758, 759

[56] References Cited

U.S. PATENT DOCUMENTS

| | | | |
|---|---|---|---|
| 1,589,915 | 6/1926 | Whitehead | 301/41 W |
| 2,090,870 | 8/1937 | Kay | 301/41 W |
| 3,047,339 | 7/1962 | Hamer | 301/5 B |

Primary Examiner—Russell D. Stormer

[57] ABSTRACT

A wheel hub and detachable wheel weight structure is provided for traction vehicles, such as lawn and garden tractors. The plastic hub includes a plurality of wedge shaped compartments formed in each side with adjacent compartments opening transversely to opposite sides of the hub. Separate weights are provided for the inside and outside of the hub, the weights having complementarily shaped wedge members receivable in the compartments opening to that side of the hub. Threaded fasteners secure the weights together for rotation with the hub.

15 Claims, 2 Drawing Sheets

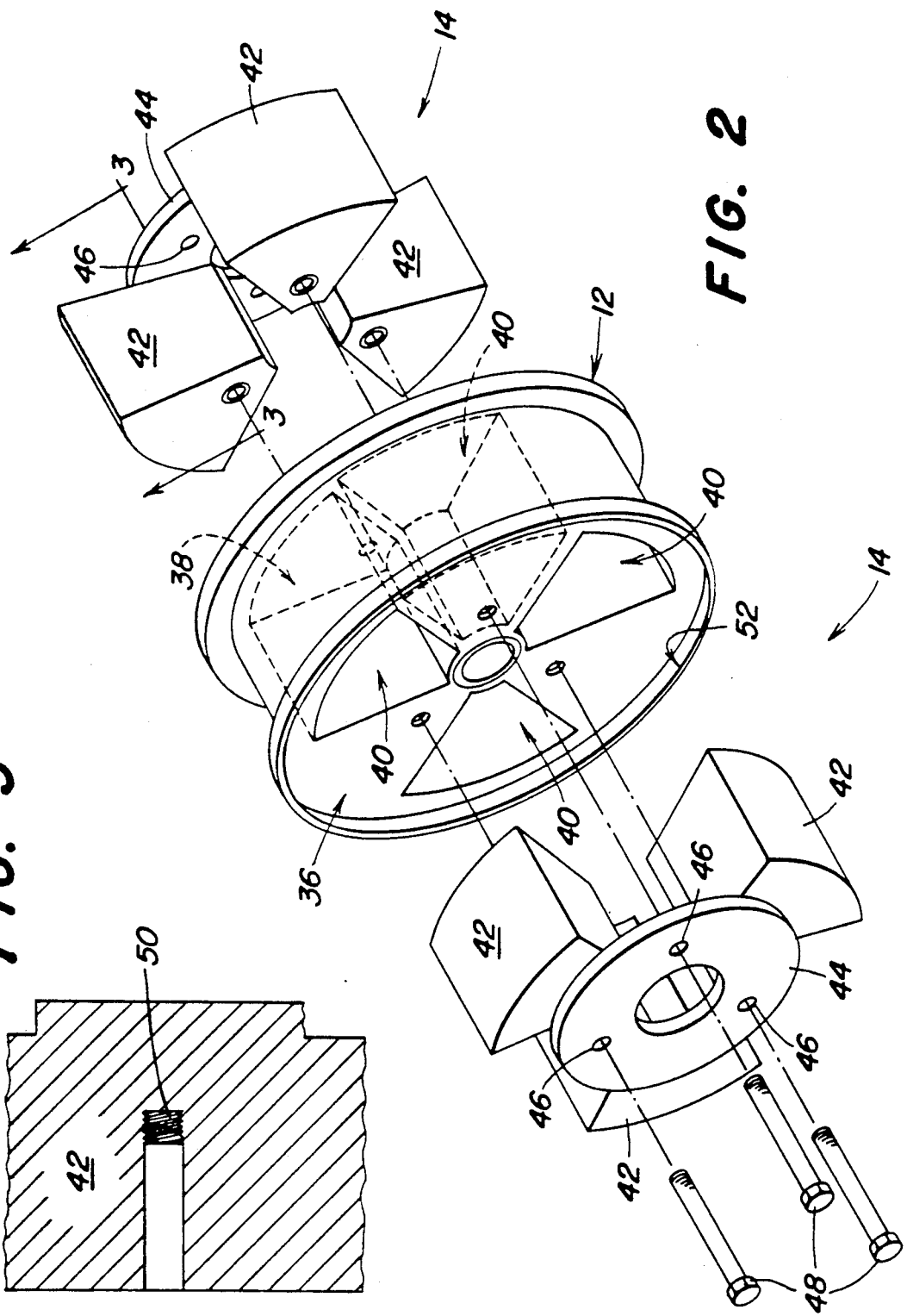

TRACTOR HUB WITH DETACHABLE WHEEL WEIGHTS

BACKGROUND OF THE INVENTION

1. Field of the Invention

The present invention relates to traction vehicles, such as lawn and garden tractors, and to detachable wheel weights used with such vehicles.

2. Description of the Related Art

Traction vehicles, such as lawn and garden tractors, often require the use of additional weights. For example, when rear engine vehicles are provided with a rear mounted grass bagger, ballasting may be required at the front to offset the build-up of weight in the bagger. Similarly, weights may be added to the rear portion of the vehicle when additional traction is desired, as, for example when operating on snow covered surfaces or towing heavy loads.

Typical ballasting structures take the form of weights hung on the front of the vehicle and/or weights mounted to the inside and/or outside of the front and/or back wheels. Such ballast when hung on the front of the vehicle, may present an unsightly structure and, when added to the wheels, which is typically to the outside surface of the wheels, not only provide an unsightly appearance but project from the hub and interfere with the vehicle's operation close to various structures and/or obstacles.

Further, those weights which are hung on the outside of wheel hubs are often heavy and awkward to handle. Their weight may impose a moment load on the wheel and its axle due to the mounting structure employed and transfer a concentrated loading to the small hub area upon which they are attached.

SUMMARY OF THE INVENTION

Accordingly, it would be desirable to provide a wheel hub and weight structure which is not mounted to the frame, wherein it could provide an unsightly and aesthetically displeasing appearance.

Further, it would be desirable to provide a weight structure which is carried by the vehicle wheels, but does not provide an unsightly addition to those wheels.

It would additionally be desirable to eliminate interference which might occur between the projecting weights carried by the vehicle and structures next to which the vehicle operates. To facilitate easier handling, it would also be desirable to reduce the size of the weights which must be attached to the vehicle hub.

In attaching the weights to the vehicle, it would be desirable to avoid the imposition of moment loads on the wheel and/or its axle and particularly it would desirable when composite and/or plastic wheel hubs are utilized.

It would further be desirable to distribute the weight over a greater portion of the hub structure rather than just on the area at which a bolt would be attached.

Accordingly, there is provided a wheel weight and hub structure comprised of a hub with compartments formed therein, the compartments being circumferentially spaced around the periphery of the hub with the compartments opening alternately to opposite sides of the hub. Weights are provided with complimentarily shaped configurations to the compartments, one weight being provided for each side of the hub and being received in the compartments which open to that side of the hub. Fastenings means taking the form of bolts are provided which connect the two wheel weight members together to secure them for movement with the hub. The wheel weight members rest or ride in the compartments and distribute the weight throughout the contact surfaces with the hub rather than directly on a particular attaching point to the hub.

BRIEF DESCRIPTION OF THE DRAWINGS

FIG. 2 illustrates an enlarged and exploded view perspective view of the wheel weights, the hub and the attaching structure provided therefor.

FIG. 3 is an enlarged partial cross sectional view taken along 3—3 of the FIG. 2 and illustrating the manner in which the bolts attached the wheel weights together.

DESCRIPTION OF THE PREFERRED EMBODIMENT

Figure 1:
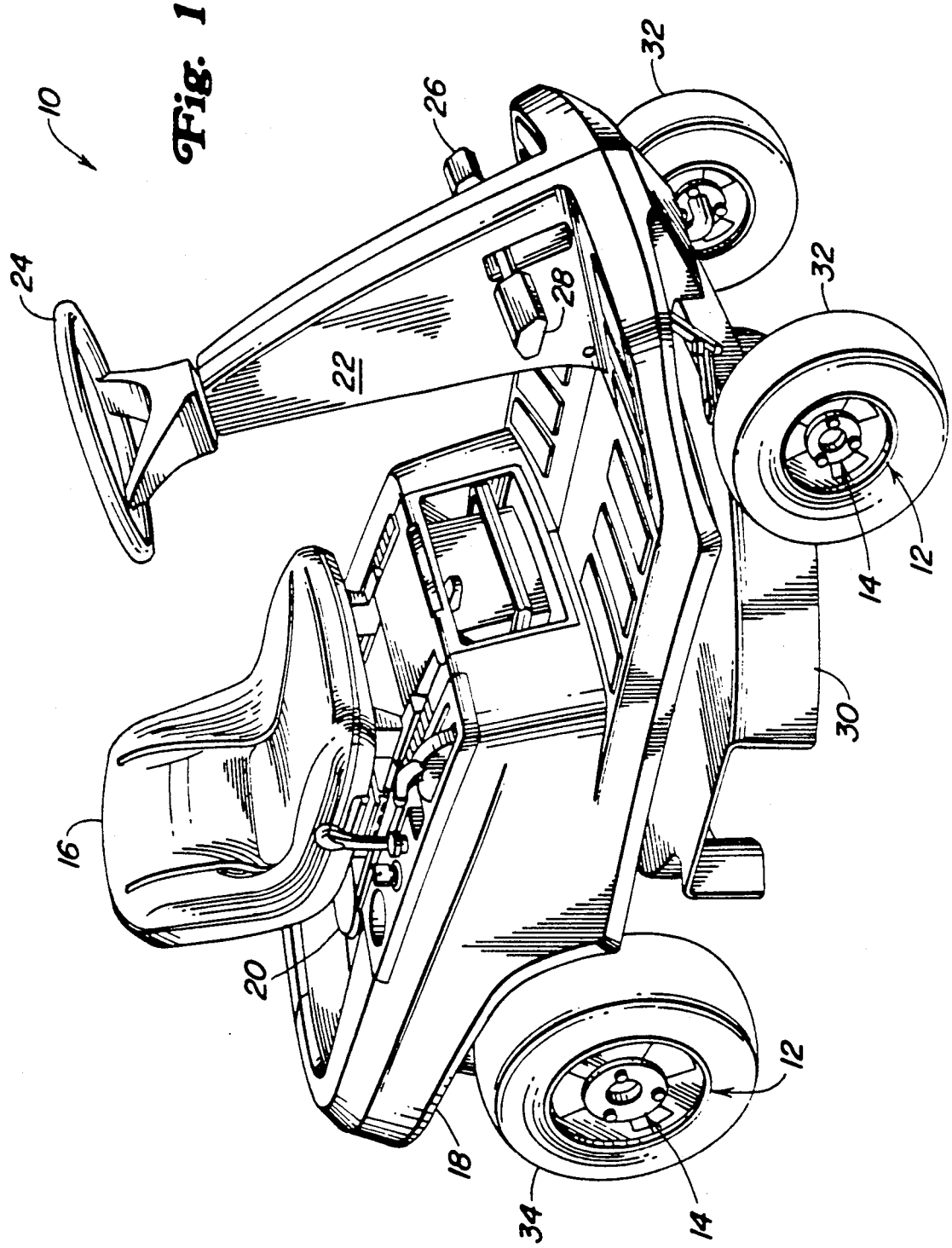
FIG. 1 illustrates a front right elevated perspective of a lawn and garden vehicle equipped with wheel hubs and weights provided according to the present invention.

Looking first to FIG. 1 there is illustrated a lawn and garden rear engine rider 10 equipped with wheel hubs 12 and weight means 14 according to the present invention.

The vehicle 10 includes an operator's seat 16 carried on a chassis 18, the chassis 18 being equipped with an engine 20, a steering column and wheel 22 and 24, clutch and brake pedals 26 and 28, and a mower unit 30 suspended beneath the chassis 18. Front and rear wheels 32 and 34 are provided with the front wheels 32 being steerable. The wheels 32 and 34 are equipped with hubs 12 which receive the wheel weight structures 14 according to the present invention.

Looking now to FIG. 2 where there is illustrated an exploded view of a wheel hub 12 and the wheel weight means 14, it is noted that the hub 12 includes a pair of transversely spaced apart walls 36 and 38 with adjacent compartments 40 taking the form of arcuately shaped wedges. The circumferentially spaced compartments 40 open alternately to opposite sides 36 and 38 of the hub 12 so that each weight member 42 is carried adjacent to a weight member 42 mounted in the opposite side of the hub 12

In the preferred embodiment, the weight members 42 comprise a sectional or wedge form spanning approximately one-sixth (1/6) of the circumference of the wheel hub 12. Accordingly, three weight members 42 are provided on each of the weight means 14 used with the hub 12. Each weight member 42 is attached in turn to a ring-shaped plate 44 which is rigidly attached to the three weight members 42, the ring member 44 being provided on the outside surface of the hub 12 when the weight members 42 are inserted in the hub 12. The ring member 44 is provided with three openings 46 through which bolts 48 are inserted, pass through the wall 36 or 38 and into one of weight members 42 of the other weight means 14. Threads 50 (see FIG. 3) are provided inside the other weight member 42 to allow the bolt 48 to be fastened to that weight member 42. Accordingly, the fastening means connects one weight means 14 with the other weight means 14 rather connecting the weight means 14 to the hub 12 itself. Since the preferred embodiment utilizes a composite or plastic hub 12, the fastening means allows the weights 42 to be supported by the surfaces of the hub compartment rather than through a bolt connection directly with the hub 12.

In operation, the weight means 14 is attached to the wheel 12 after removing it from the axle by simply removing the hubcap or dust cover (not shown) provided on the outside of the hub 12. The wheel weight means 14 are then inserted into the compartments or openings 40 on each side 36 and 38 of the wheel and the bolts 48 inserted through the openings 46 in the ring member 44, and advanced into the threads 50 provided in the weight members 42 of the opposite weight means 14. The weight means 14 does not project from the hub 12 and in the preferred embodiment, room is provided in the rim 52 of the hub 12 for attaching the dust cover and/or hubcap to disguise the fact that weights are being used on the wheels. Since the weight means 14 do not protrude from the hub 12, they will not interfere with the operation of the tractor close to obstacles or other structures.

Because the weight means 14 are provided in two components, they are half the weight of a typical wheel weight member thereby making it easier for the operator to mount and dismount them.

The weight means can also be provided in sizes that permit them to be added to either the front or rear wheels, thereby adjusting the amount of ballast which is added for particular conditions.

From the foregoing, it is apparent that the present invention provides a wheel hub and weight structure which is quick and easily attached to the wheel, is aesthetically pleasing, can be disguised if desired by a hubcap or dust cover, does not project from the wheels during operation to interfere with the operation of the vehicle, is selectively mountable or removable as desired through quick and easy fastening structures, does not put concentrated or uneven loads on the wheel hub and/or axle structure and is light and easy to handle and install and/or remove.

We claim:

1. Detachable wheel weights usable in a wheel hub having spaced apart inside and outside wall structures oriented generally perpendicular to its axis of rotation,
the hub including, a plurality of circumferentially spaced compartments formed between the wall structures, with adjacent compartments having openings in opposite wall structures;
the detachable wheel weights including first and second wheel weight means having weight members which are complimentarily shaped to and receivable in the compartments, the first and second weight means being receivable respectively in the compartments of the inside and outside wall structures; and
means for detachable fastening said first and second weight means together and in said compartments.

2. The invention defined in claim 1 wherein the compartments are in the form of arcuately shaped wedges.

3. The invention defined in claim 1 wherein there are three compartments opening to each side of the hub.

4. The invention defined in claim 3 wherein the first and second weight means each include three weight members receivable i the three compartments.

5. The invention defined in claim 3 wherein the three compartments assume the form of arcuately shaped wedges.

6. The invention defined in claim 1 wherein the fastening means includes first and second ring members respectively rigidly joined to the weight members of each of the first and second weight means, with bolt means passing through at least one ring member and into a weight member of the other weight means.

7. The invention defined in claim 1 wherein the wheel hub is formed of a plastic material.

8. The invention defined in claim 1 wherein there is further provided wheel cover means securable to the outside of the hub for obscuring the weight means received in that side of the hub.

9. A wheel hub and wheel weight combination usable with a traction vehicle, said hub including a plurality of compartments circumferentially spaced about the axis of rotation of said hub, adjacent compartments opening alternately to the inside and outside walls of said hub.
first and second wheel weight means, each weight means including weight members receivable respectively in the compartments which open to the inside and outside walls,
plate means rigidly interconnecting the weight member of each weight means,
fastening means for detachable securing the plate means of each weight means to the weight member of the outer weight means.

10. Detachable wheel weights usable in a hub having a plurality of compartments formed therein, the compartments being circumferentially spaced around the axis of the hub and adapted to receive a wheel weight therein, with adjacent compartments opening to opposite sides of the hub,
the detachable wheel weights including first and second weight means, each including at least two weight members adapted to seat within compartments of a respective side of the hub;
means rigidly interconnecting the weight members of each weight means together; and
fastening means extending between the weight means for securing them together and within their respective compartments.

11. The invention defined in claim 10 wherein the fastening means extends between one means rigidly interconnecting the weight members of one weight means and the weight members of the other weight means.

12. The invention defined in claim 10 wherein the means rigidly interconnecting the weight members is a plate and the fastening means secures the plate of one weight means to the weight members of the other weight means.

13. The invention defined in claim 12 wherein the plate takes the form of a ring.

14. The invention defined in claim 10 wherein the hub and compartments are comprised of plastic material with the weight members being supported by and carried in the compartments.

15. Detachable wheel weights usable in a wheel hub having spaced apart inside and outside wall structures oriented generally perpendicular to its axis of rotation, the hub including at least three arcuately shaped compartments circumferentially spaced within each wall structure, with adjacent compartments having openings in opposite wall structures;
the detachable wheel weights including first and second wheel weight means having weight members which are complimentarily shaped to and receivable i the compartments;
a ring member rigidly joined to the weight members of each weight means; and
bolt means for fastening the ring member of one weight means to the other weight means.

* * * * *

UNITED STATES PATENT AND TRADEMARK OFFICE
CERTIFICATE OF CORRECTION

PATENT NO. : 5,116,106

DATED : 26 May 1992

INVENTOR(S) : Terry D. Hardesty et al.

It is certified that error appears in the above-identified patent and that said Letters Patent is hereby corrected as shown below:

Column 3, line 53, delete "detachable" and insert therefore -- detachably --.

Column 3, line 61, after "receivable" delete "i" and insert therefore -- in --.

Column 4, line 20, delete "detachable" and insert therefore -- detachably --.

Column 4, line 63, after "able" delete "i" and insert therefore --in--.

Signed and Sealed this

Seventh Day of September, 1993

Attest:

BRUCE LEHMAN

*Attesting Officer*     *Commissioner of Patents and Trademarks*